Nov. 24, 1959 R. P. MORRISON ET AL 2,914,199
BOAT TRAILER MOTOR SUPPORT
Filed Aug. 20, 1957

INVENTORS.
Russell P. Morrison
James D. Sproul
Acton Dunlap
BY
Popp and Sommer
ATTORNEYS.

United States Patent Office 2,914,199
Patented Nov. 24, 1959

2,914,199

BOAT TRAILER MOTOR SUPPORT

Russell P. Morrison, Arcade, James D. Sproul and Acton Dunlap, Delevan, N.Y.

Application August 20, 1957, Serial No. 679,183

3 Claims. (Cl. 214—84)

This invention relates to boat trailers, and more particularly to a boat trailer motor support.

The use of boat trailers has become increasingly popular with the advent of improved highway systems providing rapid and easy access to distant lakes and resort sites, for those interested in fishing and other water activities. The present invention permits the mounting of an outboard motor in normal position on the transom of a boat being transported upon a vehicle drawn trailer, without damage to the motor or to the boat. One advantage of such an arrangement is that it facilitates loading and launching of the boat from the trailer insofar as less time and effort is required, as compared to the case wherein the motor is carried separately, or within the boat. It also provides more room in the boat for storing of other items during transportation of the boat.

The main object of this invention is to provide a mounting of an outboard motor in normal position on the transom of a boat being transported, without damage to the motor or to the boat.

A further object of this invention is to provide an outboard motor mounting on a trailer carried boat which facilitates the loading and launching of the boat.

These and further objects and features of the invention will become more apparent from the following description and accompanying drawings wherein.

Figure 1:
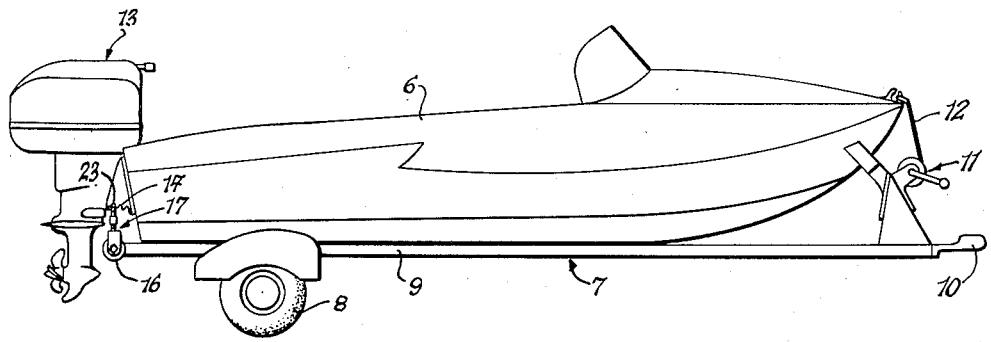
Fig. 1 is a view illustrating a boat on a trailer with a mounted motor utilizing a supporting means of the invention.
Figure 3:
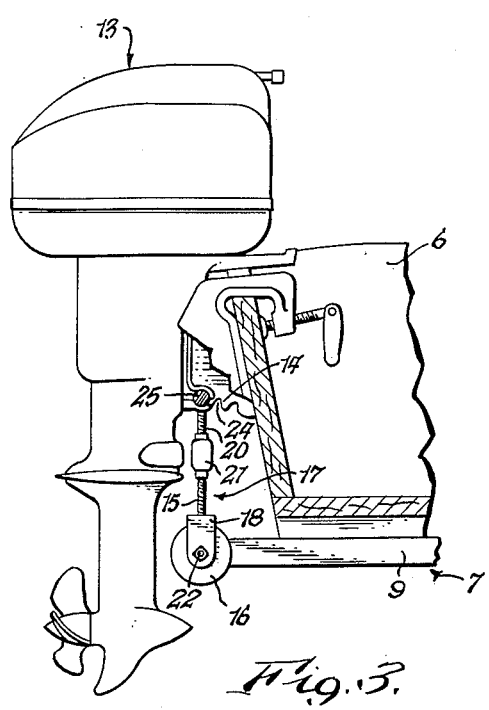
Fig. 3 is a plan view of the elements forming the motor supporting means of the invention.
Figure 2:
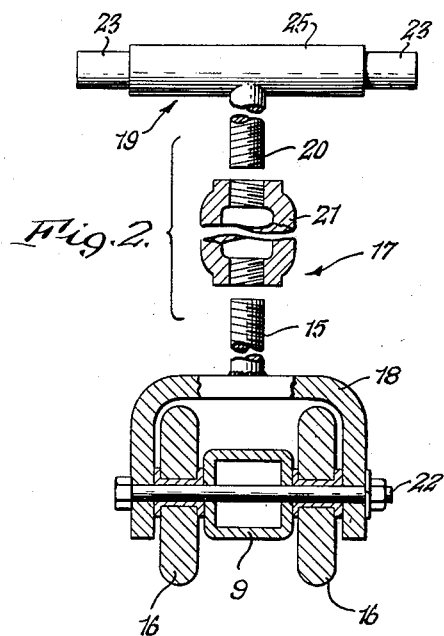
Fig. 2 is a view showing the supporting means of the invention in greater detail.

Referring now to the drawing, the numeral 6 identifies a boat which is mounted upon a trailer 7, the main parts which consist of a pair of wheels 8, a frame 9, a connection piece 10 for attachment to a vehicle (not shown), and a winch 11, the latter of which has a cord 12 for pulling the boat into position upon the trailer. An outboard motor 13, of the type having a motor tilt adjustment means 14, is mounted upon the backboard, or transom of the boat. The frame 9 extends beyond the stern of the boat and has rotatably mounted on the end a pair of wheels 16 which serve as rollers for supporting the boat as it is being loaded or removed from the trailer.

A motor support 17 embodying the principles of the invention consists of a Y-section 18 having a threaded portion 15, a T-section 19 having a threaded portion 20, and a turn buckle 21, which is threadably receivable by the threaded portions of the T-section and Y-section, and is adapted for the special adjustment of said sections. The Y-section is pivotally mounted upon a shaft 22 which supports the wheels 16 whereby the Y-section is rotatable about said wheels. The T-section includes a cross bar 25 having reduced diameter end portions 23 adapted to seat at each end within slot means 24 forming part of the motor tilt adjustment means 14.

In supporting a motor mounted upon a boat being transported by the trailer 7, the motor support 17 is arranged so that the end portions 23 of the T-section 19 engage one of the slots of slot means 24. The motor is then rotated about its pivoted connection with the transom so that it engages and clamps unto the cross bar 25 of the T-section. In such manner, a good part of the motor weight is transmitted directly to the end of the trailer frame 9, thus relieving the strain upon the boat transom. When loading or unloading the boat from the trailer, the motor support 17 is rotated downwardly about the end of the frame 9 so that it will not interfere. The turn buckle 21 allows the support to be properly adjusted when used with various motors in which there is a difference in the location of the slot means 24, relative to the end of the trailer frame 9.

From the foregoing it will be seen that a motor support embodying the principles of the invention serves as a convenient means for supporting an outboard motor mounted upon a transom of a boat being transported by a trailer. In practice, a trailer having the motor support of the invention, has been hauled over rough roads and terrain without damage to the boat or to the motor. The motor support of the invention thus provides a simple means for safely transporting a trailer mounted boat with the outboard motor in usual position upon the transom thereof.

The foregoing description has been given in detail without thought of limitation since the inventive principles involved are capable of assuming other physical embodiments without departing from the spirit of the invention and the scope of the appended claims.

What is claimed is:

1. A boat trailer motor support adapted for the support of a motor mounted upon a boat being carried by the trailer and including a Y-section element pivotally affixed to the end of the trailer, a T-section element arranged for attachment with the motor, and a turnbuckle for adjusting the position of the T-section element relative to the Y-section element.

2. In a boat trailer having roller means at the end for supporting a boat during loading or lounching, a motor support for the support of a motor mounted upon the transom of a boat being carried by the trailer and including a Y-section element pivotally affixed to the end of the trailer and arranged for rotation about the roller means, a T-section element having a cross bar to which the motor may be clamped, and a turnbuckle arranged for adjusting the position of the T-section element relative to the Y-section element.

3. In a boat trailer having roller means at the end for supporting a boat during loading or launching, a motor support for the support of a motor mounted upon the transom of a boat being carried by the trailer and including a Y-section element pivotally affixed to the end of the trailer and arranged for rotation about the roller means, a T-section element having a cross bar to which the motor may be clamped and reduced diameter end portions for engagement with tilt adjustment slot means of the motor, and a turnbuckle arranged for adjusting the position of the T-section element relative to the Y-section element.

References Cited in the file of this patent

UNITED STATES PATENTS

| 2,358,982 | Lewis | Sept. 26, 1944 |
| 2,723,038 | Peterson et al. | Nov. 8, 1955 |